Figure 1:
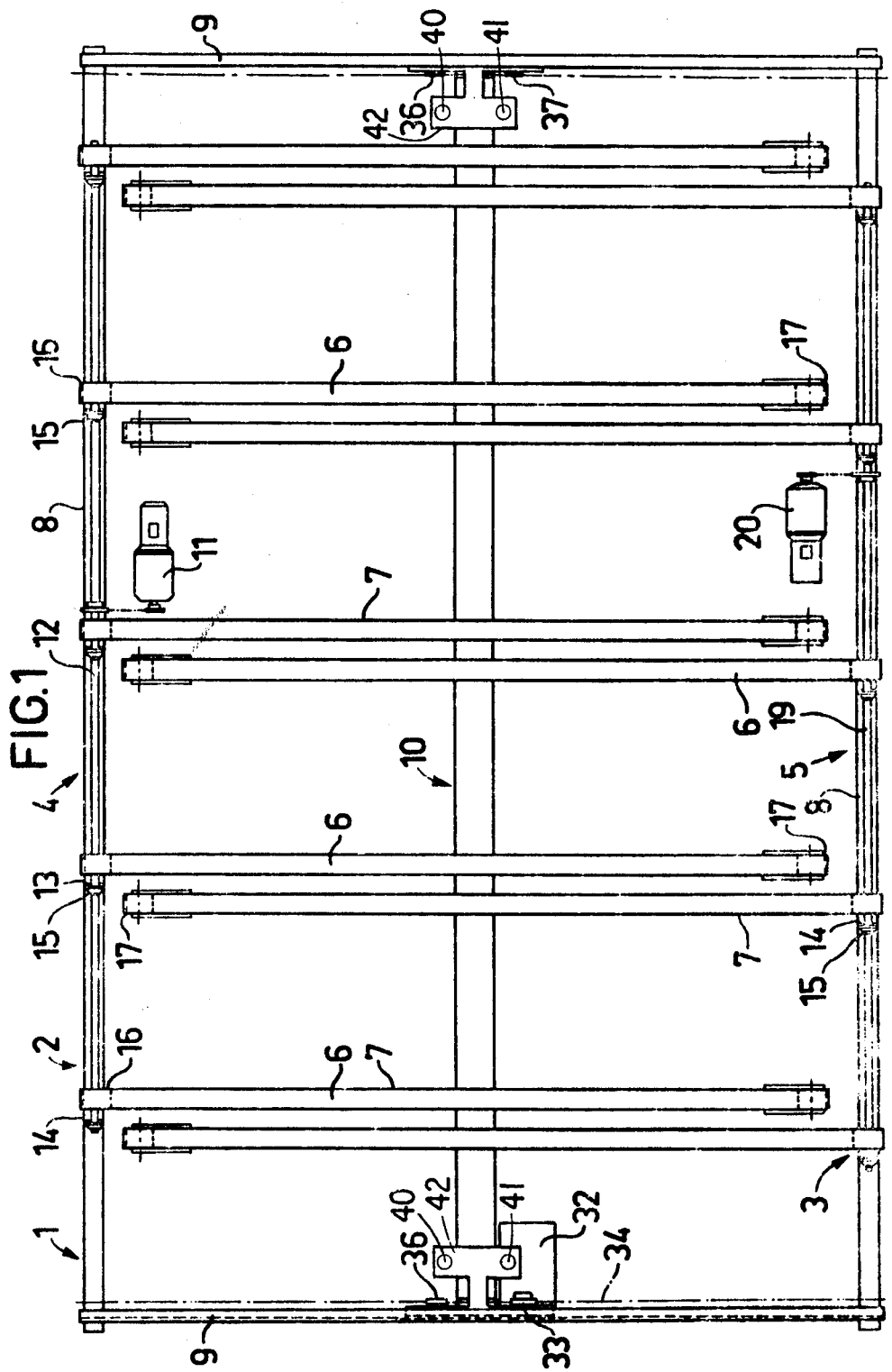

United States Patent [19]

Marklund

[11] 4,090,603
[45] May 23, 1978

[54] COLLECTING ARRANGEMENT

[75] Inventor: Erland Marklund, Skelleftea, Sweden

[73] Assignee: Renholmens Mekaniska Verkstad AB, Byske, Sweden

[21] Appl. No.: 685,511

[22] Filed: May 12, 1976

[30] Foreign Application Priority Data

May 13, 1975   Sweden ................................ 7505472

[51] Int. Cl.² ............................................. B65G 47/26
[52] U.S. Cl. .................................... 198/460; 198/466; 198/469; 198/572; 198/592
[58] Field of Search ........................ 198/347, 459–462, 198/466, 469, 470, 571, 572, 577, 582, 592, 809, 810, 817, 594, 812

[56] References Cited

U.S. PATENT DOCUMENTS

| 2,679,919 | 6/1954 | De Koning | 198/459 |
| 3,587,825 | 6/1971 | Smith | 198/592 |
| 3,751,873 | 8/1973 | Toby | 198/460 |

FOREIGN PATENT DOCUMENTS 773,784   5/1957   United Kingdom .................. 198/459

Primary Examiner—John J. Love
Assistant Examiner—Joseph E. Valenza
Attorney, Agent, or Firm—Burns, Doane, Swecker & Mathis

[57] ABSTRACT

A collecting arrangement for elongated articles such as sawn timber, preceding delivery to a processing station, includes a rectangular frame provided with a feed conveyor constituted by a set of parallel spaced endless conveyor units pivotally mounted at one end along one side of the frame and from which they are transferred to a discharge conveyor also constituted by a set of parallel spaced endless conveyor units pivotally mounted at one end along the opposite side of the frame, the discharge conveyor being operated in the same direction as the feed conveyor but in a step-like manner. The feed and discharge conveyors are supported below by a carrier girder extending transversely of and movable along the length of the conveyors on arc-shaped or polygonally curved runways extending along the other two opposite sides of the frame. The carrier girder supports the feed and discharge conveyors in different planes intersecting one another above the carrier girder and establishing between themselves a relatively small angle.

7 Claims, 4 Drawing Figures

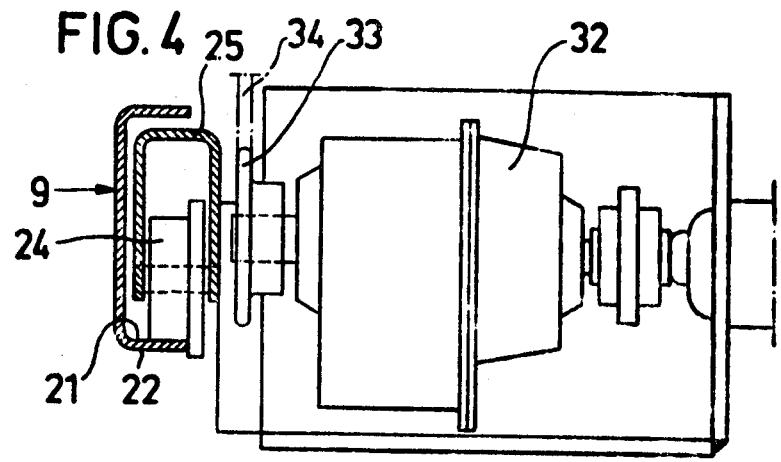
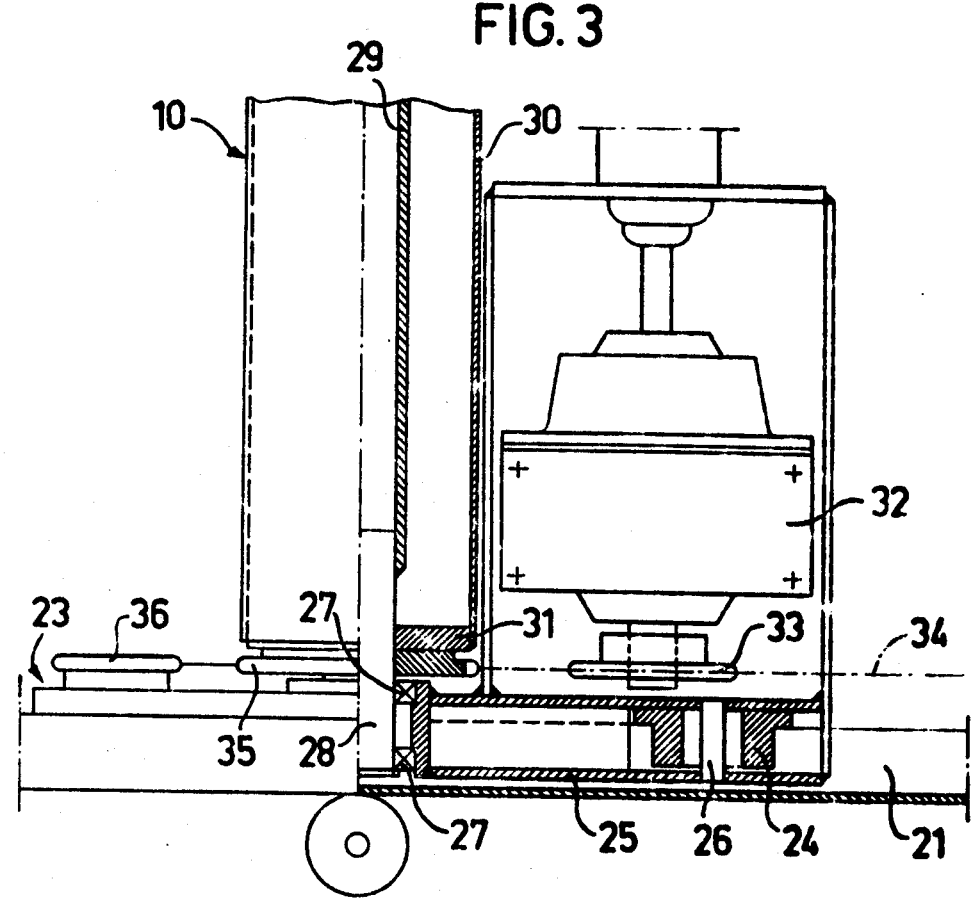

COLLECTING ARRANGEMENT

This invention relates to a collecting arrangement for elongated articles, for example sawn timber, and is intended to be disposed preferably before a working or processing station in a feed line, which may include several such stations and along which the articles are advanced perpendicularly to their longitudinal direction, in order to position the articles in an adjusted order and collected the articles thus positioned in an arranged buffer landing for balancing fluctuations in the supply.

It is previously known in trimming saws and other installations where timber is advanced to different stations along a feed line, to establish so-called buffer lines or buffer zones in the form of slide planes with or without roll stands in order to compensate for variations in the timber supply to a station, which variations may be due to technical hitches in connection with the feed of new timber to the entry end of the feed line or breaks in one of the stations. These known buffer zones, however, have several disadvantages, which substantially have their reason in the violent impacts, which at this type of buffer zones each entering timber piece unavoidably exerts upon its contact with the timber pieces already lying in the buffer zone, and which impacts often result in that timber pieces unintentionally are discharged from the buffer landing. Another effect of these impacts is that the timber pieces positioned edge against edge in the slide plane are pressed out of the plane, in which they are located, and place themselves upon underlying timber pieces. This renders it impossible to maintain a continuous discharge, especially when only one timber piece at a time is to be discharged.

The present invention has the object to bring about an entirely new and improved type of collecting arrangement or so-called buffer means not only for timber pieces but also for other elongated articles, at which arrangement or means entering articles are fed into the buffer zone without causing such impacts which can give rise to disorder of the articles already lying in said zone, and which is so constructed that it has a buffer zone varying in length and places the timber pieces in adjusted order prior to or during their feed into the buffer zone. This object is achieved thereby that the collecting arrangement according to the invention has been given the characterizing features defined in the claims.

Figure 2:
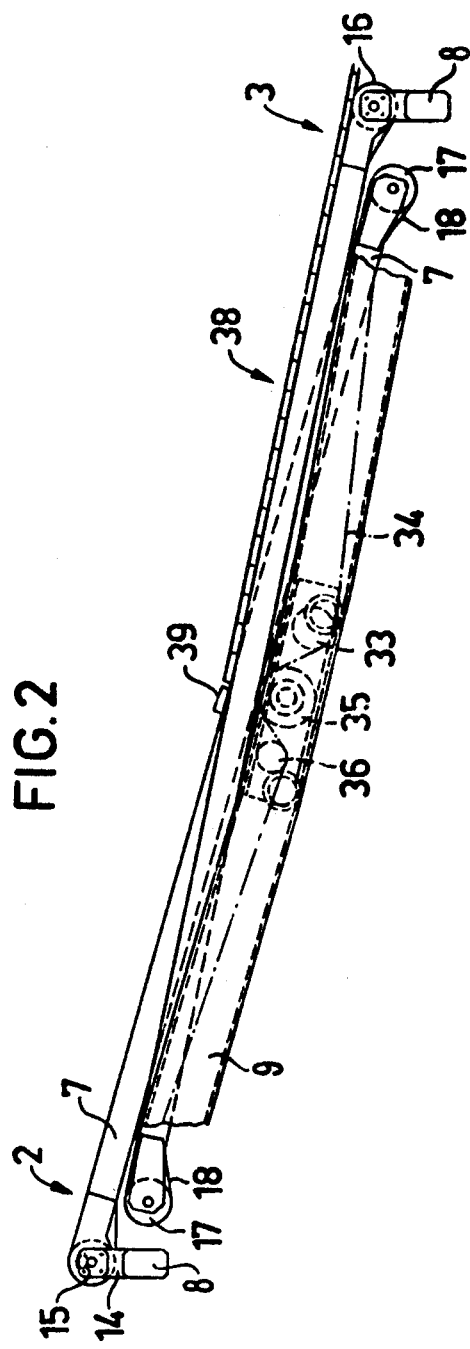

The invention is described in greater detail in the following, with reference to the accompanying drawings, in which FIG. 1 is a horizontal view of the arrangement, FIG. 2 is an end view of the same, FIG. 3 shows on an enlarged scale a detail in the arrangement according to the invention, partially in section and seen from above, and FIG. 4 is a section along the line IV—IV in FIG. 3.

The arrangement comprises a frame generally designated by 1 and provided on said frame two conveyors 2 and 3, which at the utilization of the arrangement according to the invention are called feed and, respectively, discharge conveyor, in consideration of the feed direction, indicated by the arrow 4 in FIG. 1, of the articles, which arrive at the arrangement substantially perpendicularly to their longitudinal direction and, for reason of clearness, are not shown in detail in said Figure. Said articles by way of example are assumed to be timber pieces to be advanced one at a time from the collecting arrangement in the direction indicated by 5 to a working or processing station not shown in the drawings. The frame of the collecting arrangement according to the invention can be in parallel with or inclined to the plane, in which the timber pieces are fed into the arrangement, or to the horizontal plane.

The conveyors 2 and 3 are shown to be of identical design, although this must not be the case, and comprise a plurality of arms 7 extending in the feed direction and provided with conveyor belts 6 of friction type or conveyor chain. The conveyors are carried at one end each on a frame beam 8 disposed perpendicularly in relation to the feed direction and are supported between their ends by a carrier girder 9 supported on frame beams 9 extending in the feed direction and movable along the same. The arms 7, more precisely, in the feed conveyor 2 of the arrangement are at one end individually pivotal about a common shaft 12, which is driven by a driving means 11 and lies in a recess 13 in sheet metal pieces 14 connected to one transverse frame beam 8 of the frame, and is carried by bearings 15 attached to a number of said pieces, of which bearings one is indicated screwed into the outside of such a sheet metal piece 14 in FIG. 2. Such sheet metal pieces 14, although not shown in detail in the drawings, can be found placed on both sides of the end portions of each arm pivotally connected to the shaft 12 as a guide means for the arms in question. Between said end pieces of each of the arms 7, which are not shown in detail in the drawings, a drive roller 16 for the belt 6 of the associated arm is rigidly mounted on the shaft 12. The belt is supported, besides by said drive roller 16, by a roller 17 mounted at the free end of the arm and runs with its lower strand 18 within the hollow arm 7. The arms 7 provided with belt or chain and comprised in the discharge conveyor 3 of the arrangement are designed in a similar way and individually pivotal about a common drive shaft 19 mounted at the other transverse frame beam of the frame in the same way as the drive shaft 12 of the feed conveyor and have a drive means 20 of their own for driving the belts of chains 6 of the discharge conveyor intermittently or in steps. The discharge conveyor 3, thus, as distinguished from the feed conveyor 2 is intended for intermittent or stepped operation, but in the same direction as the feed conveyor 2.

The carrier girder 10 movable along the longitudinal frame beams 9 and at the embodiment shown of cylindric shape is located with its surface facing toward the arms of the conveyors beneath a plane through the drive shafts 12 and 19 of the conveyors, so that it supports the arms 7 of the conveyors in different planes, which intersect each other straightly above the centre of the carrier girder and at an acute angle $\alpha$ between the arms, as shown in FIG. 2. This angle should be relatively small, so that the timber pieces unobstructedly can be transferred from the feed conveyor to the discharge conveyor 3. In order to prevent this angle upon movement of the carrier girder 10 in one or the other direction from changing and becoming too great so as to render the transport of timber pieces from one conveyor to the other difficult, the carrier girder 10 is adapted to be moved along runways 21 of arc or polygonally curved shape formed at each longitudinal frame beam. By a suitable choice of the radius of curvature for these runways, said angle $\alpha$ in agreement with the embodiment shown can be maintained substantially unchanged during the movement of the carrier girder 10 between these two end positions.

At the embodiment shown, with U-shaped frame beams 9 which are curved to arc-shape and have inward facing flanges, said runways consist of the lower flanges 22 of the frame beams. On these flanges the carrier girder 10 is moved by means of carriages 23, which are provided at both ends of the girder and have flange wheels 24 located on both sides of the carrier girder. The flange wheels 24 are supported each on an axle 26 in the U-shaped chassis of the carriage. The carrier girder 10 is suspended in these carriages 23 by means of axle journals 28 provided at its ends and supported by means of bearings 27 in the carriages 23. The journals are shown interconnected by a tube 29. In addition to this tube, the carrier girder 10 consists of a cylindric outer casing 30, which is supported about the tube 29 by end wall pieces 31 provided on the journals 28. Between the tube 29 and the outer casing 30 distance pieces (not shown) can be provided in spaced relationship along the length of the girder in order to increase the bearing resistance and prevent deflection of the carrier girder.

For moving the carrier girder 10 along the runways 21, a drive motor 32 connected to one carriage 23 is provided which comprises a sprocket wheel 33 for co-operation with a drive chain 34, the ends of which are secured in the frame 1, and which has about the same extension as the frame beams 9 of the frame. The drive chain 34 is drawn between its ends beneath the sprocket wheel 33 of the drive motor and over a sprocket wheel 35 connected to the end of the carrier girder, the diameter of division of which preferably is made equal to the outer diameter of the carrier girder, and further beneath a deflector wheel 36 supported on the carriage 23. At the other end of the arrangement a similar transmission is provided which differs from the aforedescribed one only thereby that the sprocket wheel 33 of the drive motor is exchanged against a deflector wheel 37 mounted at the carriage. Due to the rotary mounting of the carrier girder 10 in the two carriages, the drive movement is transferred through the carrier girder 10 from one end to the other, and the carrier girder 10 thereby will be moved in parallel. When the sprocket wheel 33 driven by the motor 32 is turned in clockwise direction in FIG. 2, the carrier girder 10 is moved in the feed direction of the conveyors, and at opposed direction of rotation of the sprocket wheel 33 the carrier girder is moved against said feed direction. Simultaneously with the movement of the carrier girder 10 also the point of intersection between the arms 7 of the two conveyors is changed, which point in general always is located above the carrier girder.

When now a timber piece, for example 39 in FIG. 2, arrives in the collecting arrangement, it is advanced by the feed conveyor 2, which in operation always is driven, in the direction indicated by the arrows 4 and 5 and perpendicularly to its longitudinal direction until it abuts the buffer landing 38 shown in FIG. 2 which is supported on the discharge conveyor 3 in a buffer zone, which always is that part of the discharge conveyor which extends from the point of intersection between the two conveyors to the discharge end of the discharge conveyor. When at the same time a timber piece is discharged out of the buffer zone, the ingoing timber piece 39 is transferred from the feed conveyor 2 of the collecting arrangement to its discharge conveyor 3, and no movement of the carrier girder 10 is required. When, however, a discharge from the buffer zone does not take place, the drive motor 32 is started and effects movement of the carrier girder 10 against the feed direction indicated by the arrows 4 and 5 until the timber piece has been transferred from the feed conveyor to the discharge conveyor 3. This transfer, thus, takes place by the displacement of the intersection point between the conveyors. Thereafter the drive motor is stopped, and thereby also the carrier girder 10, unless a new timber piece already has arrived. If such is the case, the carrier girder is moved through a further step. The drive motor 32 preferably is controlled by impulses from a control means 40, 41 of known type for example in the form of photoelectric cells or the like supported on the carriages on both sides of the carrier girder 10 and, which record the timber piece arrived last and emit such impulse after a certain time has elapsed and the timber piece still remains in its position.

At the discharge of a timber piece out of the buffer zone 38 the discharge conveyor 3 of the collecting arrangement is started. The conveyor operates intermittently or in steps, in such a manner, that all timber pieces on the discharge conveyor are displaced, and an intermediate space is thereby formed between the intersection point of the two conveyors and the last timber piece in the buffer zone. As soon as such an intermediate space is formed, this is recorded by a control means 40, 41 of known type on support members 42, 42 mounted on the carriages on both sides of carrier girder 10 and, which causes the drive motor 32 to start in order to move the carrier girder in the feed direction of the timber pieces until said control means records the existence of a timber piece. The drive motor 32 then stops, unless the discharge is intended to proceed continuously.

Due to the fact that ingoing timber pieces always are advanced to abutment against the buffer landing on the discharge conveyor 2 or are transferred on one or more of the belts of the discharge conveyor, automatically the effect is achieved that also timber pieces arriving obliquely are adjusted to order and introduced into the buffer zone in parallel with the timber pieces located there. By controlling the drive motor of the discharge conveyor it also is possible to bring about a buffer landing, in which the timber pieces are spaced from each other, and at the discharge from such a buffer landing the collecting arrangement has the same function as a one-piece feeder, so that in such cases no special one-piece feeders are required.

The present invention is not restricted to the embodiment described above and shown in the drawings but can be altered and modified in many different ways and also be applied to purposes and products other than those indicated above. It further is to be pointed out that the drive of the carrier girder 10 can be effected in many other ways than described, within the scope of the inventive idea, and the carrier girder 10 need not be mounted rotatably, but can be rigidly connected with the carriages 23 and may also be designed in a manner different from that shown in the drawings. Each arm, furthermore, may be provided at its free end with guide means for lateral stabilization co-operating with guide grooves connected at the frame.

What I claim is:

1. A collecting arrangement of the type set forth comprising a support frame having first and second frame sides;

a first conveyor having its one end portion pivotally mounted at said first frame side of said support frame and its other end portion directed toward an opposed second frame side of said support frame;

a second conveyor having its one end portion pivotally mounted at said second frame side and its other end portion directed toward said first side;

said conveyors intersecting at an intersection point; a carrier girder supporting said first and second conveyors between said first and second frame sides in different planes and enabling transfer of an article from said first conveyor to said second conveyor;

said carrier girder being movable in and against the feed direction of said first and second conveyors to change the intersection point between said first and second conveyors and thus the effective length thereof; and means to move the carrier girder in response to the differences of the supply of the feed conveyor and the demand of the discharge conveyor.

2. A collecting arrangement according to claim 1, wherein said carrier girder supports the two conveyors in different planes intersecting one another above the carrier girder and having between themselves an angle which is smaller than 15°.

3. A collecting arrangement according to claim 1, in which said carrier girder is movable along curved runways.

4. A collecting arrangement according to claim 3, wherein said runways are so curved that the angle between the plane of the conveyors is maintained substantially constant along the entire movement range of the carrier girder.

5. A collecting arrangement according to claim 1, in which each conveyor comprises spaced arms each carrying a driven conveying belt or chain and being individually pivotal about an axle.

6. A collecting arrangement according to claim 1, in which the carrier girder is supported on carriages which are provided at the ends of the girder and movable along the runways.

7. A collecting arrangement according to claim 6, further including control means supported on the carriages on both sides of the carrier girder and controlling movement of the carrier girder in response to the ingoing and outgoing flow.

* * * * *